United States Patent [19]

Morita et al.

[11] Patent Number: 4,700,041
[45] Date of Patent: Oct. 13, 1987

[54] METHOD AND APPARATUS FOR PROJECTION WELDING

[75] Inventors: Takeshi Morita; Takio Okuda; Kazumichi Machida, all of Amagasaki; Yoshio Sato; Yoshitaka Nakamura, both of Inazawa, all of Japan

[73] Assignee: Mitsubishi Denki Kabushiki Kaisha, Tokyo, Japan

[21] Appl. No.: 920,640

[22] Filed: Oct. 21, 1986

[30] Foreign Application Priority Data

Oct. 22, 1985 [JP] Japan ............................... 60-235621

[51] Int. Cl.$^4$ ............................................. B23K 9/22
[52] U.S. Cl. .......................................... 219/96; 219/95
[58] Field of Search ....................... 219/95, 96, 98, 99

[56] References Cited

U.S. PATENT DOCUMENTS 3,364,564  1/1968  Kurtz et al. ........................ 219/98
4,115,682  9/1978  Kavesh et al. .

FOREIGN PATENT DOCUMENTS 59-110479   6/1984  Japan .
59-223180  12/1984  Japan .

OTHER PUBLICATIONS

Union Carbide Catalog Excerpts for "Ultrapulse Welding Machine Model 2030/2", 12/1980.

Primary Examiner—Clifford C. Shaw
Attorney, Agent, or Firm—Sughrue, Mion, Zinn, Macpeak and Seas

[57] ABSTRACT

Two metal plates 1a, 1b are projection welded together using a truncated conical projection 12 on a first one of the plates having a spherical end surface. The plates are pressed together through the projection, and a welding current pulse is applied which reaches a maximum value in less than 2 milli-seconds. The shape and dimensional limitations of the projection coupled with the high amplitude, short duration current spike result in a thin welding nugget 9 and prevent any thermal distortion of the outer plate surface due to localized overheating.

5 Claims, 11 Drawing Figures

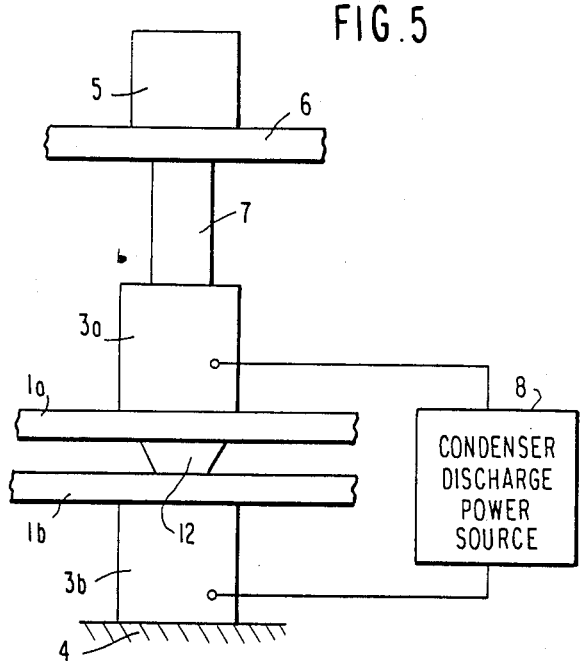
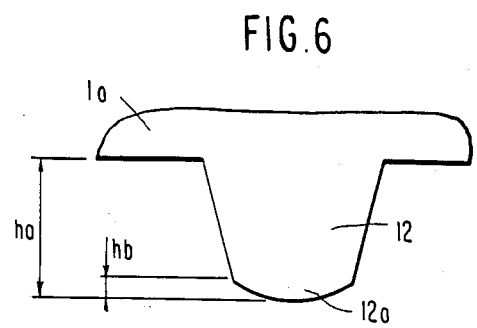
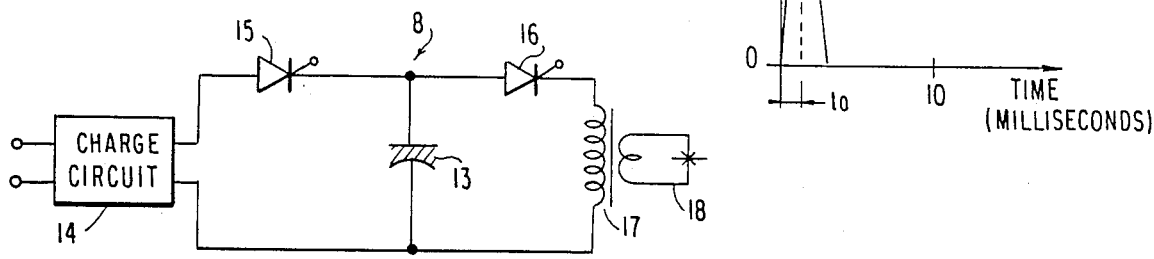
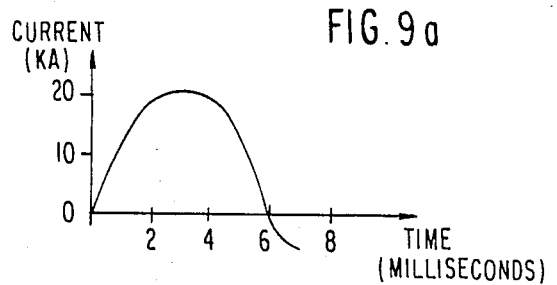
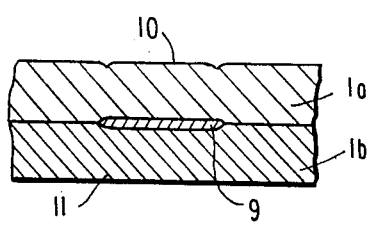
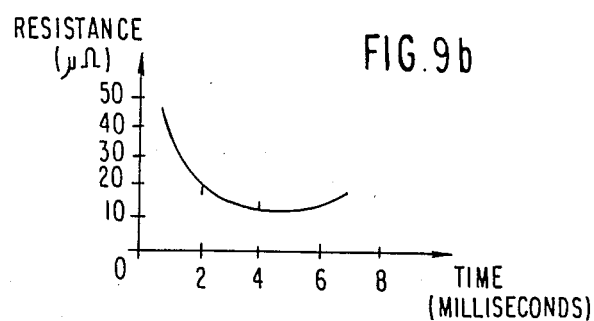

METHOD AND APPARATUS FOR PROJECTION WELDING

BACKGROUND OF THE INVENTION

This invention relates to a method and apparatus for projection welding metal bodies together.

FIG. 1 shows a schematic side view of a conventional projection welding apparatus useful, for example, to weld inner and outer annealed steel door plates 1a and 1b together in order to reinforce the outer plate. In FIG. 1, a hemispherical projection 2 is formed on the inner plate 1a; the outer plate 1b is flat and planar, at least in the vicinity of the weld connection to be made. Reference numeral 3a designates an upper electrode for applying a welding current pulse to the inner plate 1a, 3b is a lower electrode fixed to a base stand 4 for applying a welding current pulse to the outer plate 1b, and 5 is an air cylinder fixed to an upper stand 6 for pressing the upper electrode 3a downwardly through a rod 7. The upper and lower electrodes are connected to a power source 8, and are insulated from the stands 4, 6. The power source 8 is typically either a single phase alternating current power source or a condenser discharge power source.

FIG. 2 shows the current waveform from a suitable single phase alternating current power source, with the ordinate designating the current in kilo-amperes and the abscissa designating the time in milli-seconds. FIG. 3 shows the current waveform from a suitable condenser discharge power source wherein the time (ta) for the current to reach a maximum value is 10 milli-seconds. As before, the ordinate designates the current in kilo-amperes and the abscissa designates time in milli-seconds.

In the use of the conventional projection apparatus shown in FIG. 1, the projection 2 on the inner metal plate 1a is abutted against the outer metal plate 1b, whereafter both plates are urged together by pressurizing the air cylinder 5 to a predetermined level and the power source is simultaneously triggered to apply a high energy welding signal across the electrodes 3a, 3b. A current thus flows from the plate 1a to the plate 1b through the projection 2 and is concentrated at the contact interface between the projection and the outer plate. The Joule heat generated thereby quickly fuses the inner and outer plates together.

In such a conventional projection welding process the relatively long power application time, from 20~400 milliseconds, causes the periphery of the welding zone to become overheated, which thermally distorts the outer plate 1b.

FIG. 4 shows a sectional view of a weld made according to the conventional process, wherein reference numeral 9 designates a welding nugget formed by the fused projection 2, 10 is the rear portion of the inner plate, and 11 is a surface distortion of the outer plate 1b caused by the thermal contraction of the welding nugget. The depth of such distortion is typically 20~40 μm which detracts from the surface appearance of the plate 1b, and this necessitates the application of a filler composition and the subsequent shaving thereof pursuant to surface finishing or painting.

SUMMARY OF THE INVENTION

This invention avoids the above mentioned problems by providing an improved method and apparatus for projection welding wherein the thermal surface distortion of the outer plate is prevented by using a truncated conical projection having a spherical end surface of relatively large radius and an axial height of about 10~20% of the overall height of the projection. Such overall height is at least 0.2 mm but not greater than the thickness of the inner plate, and a high amplitude, short duration welding current pulse is used which reaches its maximum value in less than 2.0 milli-seconds.

BRIEF DESCRIPTION OF THE DRAWINGS

FIG. 5 is a schematic elevation of a projection welding apparatus according to an embodiment of the present invention;

FIG. 6 is an enlarged side view of a weld projection in accordance with the invention;

FIG. 7 is a characteristic diagram showing a current waveform from an improved condenser discharge current source;

FIG. 8 is a circuit diagram of such improved condenser discharge current source having the characteristic shown in FIG. 7;

FIG. 9(a) is a characteristic diagram of a current waveform from a single phase alternating current spot weld of an annealed steel plate;

FIG. 9(b) is a characteristic diagram of the resistance across the welding zone during such single phase alternating current spot weld; and FIG. 10 is a sectional view of a weld connection made according to the invention.

DETAILED DESCRIPTION OF THE PREFERRED EMBODIMENTS

Figure 1:
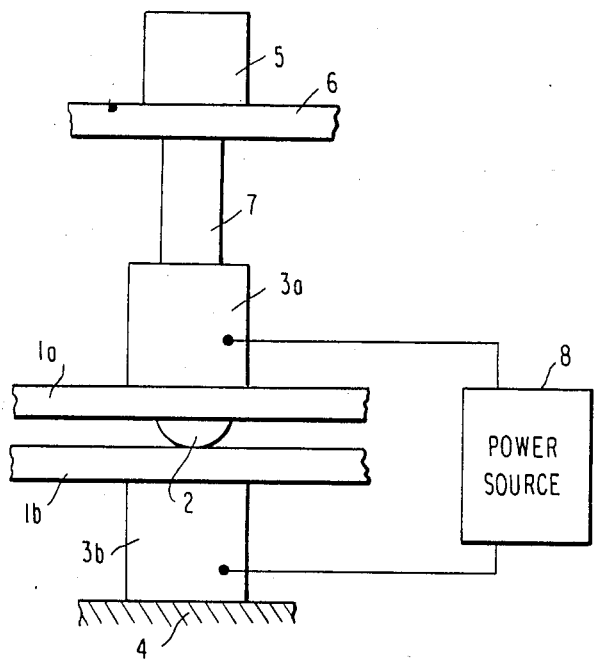
FIG. 1 is a schematic elevation of a conventional projection welding apparatus.
Figure 4:
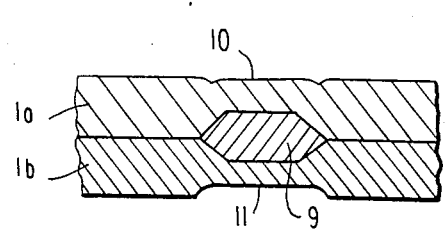
FIG. 4 is a sectional view of a welding connection made according to the conventional process.
Figure 2:
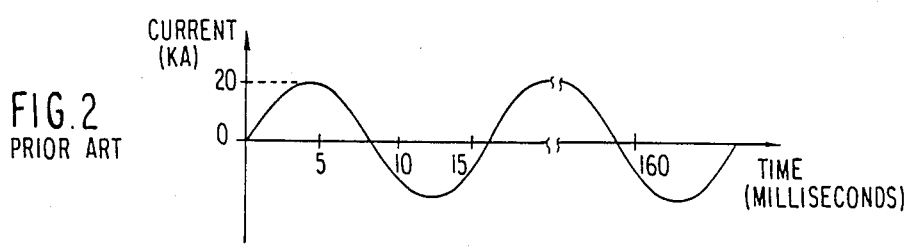
FIG. 2 is a characteristic diagram showing the current waveform of single phase alternating current power source.
Figure 3:
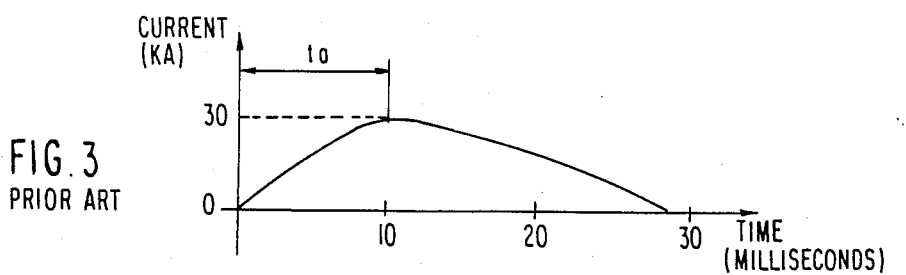
FIG. 3 is a characteristic diagram showing the current waveform of a condenser discharge power source.

Referring to FIGS. 5 and 6, wherein the same components as those shown in FIG. 1 are similarly designated, reference numeral 12 designates a conical projection on the inner plate 1a having a spherical outer surface portion 12a. The height ha of the projection 12 is, for example, greater than 0.2 mm but less than the thickness of the inner metal plate 1a. The height hb of the spherical surface portion 12a is about 10~20% of the height of the overall projection ha.

The power source 8 is a condenser discharge current source having an output characteristic as shown in FIG. 7, wherein the time (ta) for the current to reach a maximum value is less than 2 milli-seconds.

FIG. 8 shows a circuit diagram of a condenser discharge current source having a characteristic as shown in FIG. 7. A condenser 13 is charged by a control circuit 14 with a switch 15 closed and a switch 16 open. After the condenser voltage reaches a predetermined value switch 15 is opened and switch 16 is closed, which dumps the energy stored in the condenser through the primary winding of a welding transformer 17. The resulting voltage spike induced in the secondary circuit 18 of the transformer is applied across the electrodes 3a, 3b to produce the high amplitude, short duration welding current pulse shown in FIG. 7.

FIG. 9(a) shows a current waveform measured when an annealed steel plate(s) is spot welded by a single phase alternating current, and FIG. 9(b) shows the corresponding resistance measured during such spot welding. The high initial resistance, as shown in FIG. 9(b), represents the contact resistance between the plates 1a, 1b, which rapidly decreases after 1~2 milliseconds. Accordingly, it is sufficient to apply a welding current to the plates 1a, 1b which reaches a maximum value in less than 2 milli-seconds in order to fix the plates together due to the high initial contact resistance. Such a short duration weld avoids the localized overheating of the plates, and thus prevents their thermal distortion. To accomplish this the welding current spike must increase more rapidly than in the conventional process (FIG. 9(a)), and should reach a maximum value in less than 2 milli-seconds as shown in FIG. 7.

When a high amplitude current is applied to the plates over a short time interval, i.e. less than 2 milliseconds, using a conventional hemispherical projection as in FIG. 1, an explosive reaction is likely to occur due to the very high current concentration at the point of contact between the projection and the plate 1b. When a flat topped projection is used, on the other hand, the current is concentrated around the periphery of the projection due to the surface or skin effect, which results in a weakened or discontinuous weld in the central portion of the projection. These problems are substantially eliminated by the truncated conical projection configuration of the invention, having an outer or end surface of spherical shape with a relatively large radius of curvature related to the thickness of the plate 1a. The height of such spherical surface portion hb is preferably about 10~20% of the overall height of the projection ha. With a projection height of less than 0.2 mm the current tends to form flow paths between the two plates 1a, 1b outside of the projection and a poor or spotty weld results. If the projection height exceeds the thickness of the plate 1a, however, a gap may remain between the two plates after the completion of the weld. Accordingly, the lower limit of the overall projection height is about 0.2 mm and its upper limit is selected to not exceed the thickness of the plate 1a.

With this invention, due to the projection configuration and limitations and the short welding current duration of less than 2 milli-seconds to a maximum value, the plates 1a, 1b are securely joined together by a comparatively thin welding nugget 9 as shown in FIG. 10, and no noticeable thermal distortion of the surface of the outer plate 1b results. This, of course, eliminates the need to fill and shave the surface coating.

What is claimed is:

1. A method for projection welding first and second metal plates (1a, 1b) together, comprising the steps of:
   (a) forming a projection (12) on and outstanding from a surface of the first plate, said projection being configured as a truncated cone having a spherically shaped outer end with a relatively large radius of curvature such that it defines substantially less than a full hemisphere,
   (b) disposing the plates in an overlying orientation with the outer end of the projection in contact with a surface of the second plate,
   (c) applying pressure to urge the plates together along a line of force extending through the projection, and
   (d) simultaneously with step (c), applying a voltage across the plates to generate a high amplitude current pulse flow through the projection, said current pulse reaching a maximum value in less than 2.0 milli-seconds.

2. A method according to claim 1, wherein the axial height of the projection is at least 0.2 mm but less than the thickness of the first plate.

3. A method according to claim 2, wherein the axial height of the spherically shaped outer end of the projection is from 10~20% of the axial height of the overall projection.

4. A method according to claim 3, wherein the maximum value of the current pulse amplitude is greater than 20 KA.

5. In an apparatus projection welding first and second metal plates (1a, 1b) together, wherein a projection is provided on and outstands from a surface of the first plate, said apparatus comprising means (5) for applying pressure to urge the plates together along a line of force extending through the projection, said projection being disposed between the plates and having an outer end in contact with a surface of the second plate, and means (8, 3a, 3b) for simultaneously applying a voltage across the plates to generate a high amplitude current pulse flow through the projection, said current pulse reaching a maximum value in less than 2.0 milli-seconds, an improved projection characterized by
   (1) the projection being configured as a truncated cone,
   (2) the outer end of the projection being spherically shaped with a relatively large radius of curvature such that it defines substantially less than a full hemisphere,
   (3) the axial height of said spherically shaped outer end being from 10-20% of the axial height of the overall projection, and
   (4) the axial height of the overall projection being at least 0.2 mm but less than the thickness of the first plate.

* * * * *